(12) United States Patent
Sano et al.

(10) Patent No.: US 8,273,442 B2
(45) Date of Patent: Sep. 25, 2012

(54) WELDING ARRANGEMENT FOR PLASTIC COMPONENTS

(75) Inventors: Masahide Sano, Saitama (JP);
Masamitsu Shiono, Saitama (JP);
Kazuyuki Tateishi, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 505 days.

(21) Appl. No.: 12/231,214

(22) Filed: Aug. 29, 2008

(65) Prior Publication Data
US 2009/0056882 A1 Mar. 5, 2009

(30) Foreign Application Priority Data

Sep. 4, 2007 (JP) ................................. 2007-229416
Sep. 4, 2007 (JP) ................................. 2007-229418

(51) Int. Cl.
B32B 37/00 (2006.01)
B29C 65/08 (2006.01)
B29C 65/06 (2006.01)
B62D 25/14 (2006.01)

(52) U.S. Cl. ........ 428/101; 428/137; 428/138; 428/139; 428/172; 156/73.5; 156/73.6; 156/313; 296/70; 296/193.01; 296/193.02; 296/901.01; 180/90

(58) Field of Classification Search .................. 156/73.1, 156/73.5, 73.6
See application file for complete search history.

(56) References Cited

U.S. PATENT DOCUMENTS

| | | | | | |
|---|---|---|---|---|---|
| 4,169,751 A | * | 10/1979 | Yen | ............................... | 156/73.1 |
| 4,925,507 A | * | 5/1990 | Yamaguchi | .................. | 156/73.1 |
| 5,360,499 A | * | 11/1994 | Savovic et al. | ................ | 156/73.1 |
| 5,520,775 A | * | 5/1996 | Fischl et al. | ................ | 156/580.1 |
| 6,767,041 B2 | * | 7/2004 | Shiono | .............................. | 296/70 |
| 6,863,340 B2 | * | 3/2005 | Kawahigashi | ................. | 296/208 |
| 7,320,820 B2 | | 1/2008 | Shiono | | |
| 2005/0064133 A1 | * | 3/2005 | Shiono | ........................... | 428/119 |
| 2007/0026191 A1 | * | 2/2007 | Field | ............................. | 428/119 |

FOREIGN PATENT DOCUMENTS

| | | |
|---|---|---|
| JP | 2002-362192 A | 12/2002 |
| JP | 2003-267145 | 9/2003 |
| JP | 2004-009329 A | 1/2004 |
| JP | 2004-090697 A | 3/2004 |

* cited by examiner

*Primary Examiner* — David Sample
*Assistant Examiner* — Jeff Vonch
(74) *Attorney, Agent, or Firm* — Carrier Blackman & Associates, P.C.; William D. Blackman; Joseph P. Carrier

(57) ABSTRACT

A welding arrangement for plastic components includes a base member, a primary member abutting onto the base member and provided with a first positioning feature that engages a corresponding first positioning feature provided on the base member. A secondary member is vibration welded to the base member so as to at least partly interpose the primary member between the secondary member and base member. Because the welding is performed while the primary member is properly positioned relative to the base member on account of the first positioning feature cooperating with the corresponding first positioning feature, the positional precision of the primary member is ensured. The primary member may be additionally provided with a second positioning feature that engages a corresponding second positioning feature provided on the secondary member, so as to permit positional adjustment between them in a prescribed direction corresponding to a direction of movement of the vibration welding.

18 Claims, 8 Drawing Sheets

WELDING ARRANGEMENT FOR PLASTIC COMPONENTS

CROSS-REFERENCE TO RELATED APPLICATIONS

The present application claims priority under 35 USC §119 based on Japanese Patent Applications 2007-229416 and 2007-229418, each of which was filed on Sep. 4, 2007. The entire subject matter of these priority documents, including specification, claims and drawings thereof, is incorporated by reference herein.

TECHNICAL FIELD

The present invention relates to a welding arrangement for plastic components, and in particular to a welding arrangement for attaching two component parts by using frictional heat produced by oscillating at least one of the components.

BACKGROUND OF THE INVENTION

It is known to attach a plastic component such as a bracket to a plastic base member such as an automotive instrument panel by the vibration welding. As the vibration welding allows the component to be attached to any part of the base member, it is necessary to provide a means for positioning the component to the base member at the time of welding. In the welding arrangement disclosed in Japanese patent laid open publication No. 2004-90697, projections that can resiliently deform in a prescribed direction project from an instrument panel of a motor vehicle, and mating grooves corresponding to the projections are formed in the component so that the two parts may be properly positioned relative to each other by fitting the projections into the corresponding mating grooves and vibration welding the two parts to each other by oscillating the component in the prescribed direction by using a vibration welder.

However, according to this proposal, during the welding process, the projections inevitably deflect to a certain extent as a result of the relative movement caused by the welding process, and the component may shift in position relative to the instrument panel during the welding process. When a high positional precision is required, such a positional shifting is not tolerable.

Also, when a large number of component parts are required to be attached, a correspondingly large number of projections are required to be formed on the side of the instrument panel. However, because the instrument panel is a relatively large plastic component, it is not desirable to complicate the shape of the instrument panel in view of minimizing the manufacturing cost.

BRIEF SUMMARY OF THE INVENTION

In view of such a problem of the prior art, a primary object of the present invention is to provide a welding arrangement for plastic components that ensures a proper positioning between the two plastic components that are welded to each other.

A second object of the present invention is to provide a welding arrangement for plastic components that ensures a proper positioning without interfering with the vibration welding process.

These and other objects of the present invention can be at least partly accomplished by providing a welding arrangement for plastic components, comprising: a base member at least partly made of thermoplastic plastic material; a primary member abutting onto the base member, the primary member being provided with a first positioning feature that engages a corresponding first positioning feature provided on the base member; and a secondary member at least partly made of thermoplastic plastic material and vibration welded to the base member so as to at least partly interpose the primary member between the secondary member and base member.

Because the welding is performed between the base member and the secondary member while the primary member is properly positioned relative to the base member on account of the first positioning feature cooperating with the corresponding first positioning feature, the welding can be favorably performed while the positional precision of the primary member is ensured. The positioning features may consist of a combination of a projection and a corresponding opening or recess as can be readily appreciated by a person skilled in the art. Also, in such a case, the projection may be provided on either the primary member or the base member while the remaining member is provided with the corresponding opening.

According to a preferred embodiment of the present invention, the primary member is provided with a second positioning feature that engages a corresponding second positioning feature provided on the secondary member so as to permit positional adjustment between them in a prescribed direction corresponding to a direction of vibration of the vibration welding. It is particularly preferable if the second positioning feature of the primary member comprises a positioning projection configured to be resiliently readily deformable in the prescribed direction, and the corresponding second positioning feature of the secondary member comprises a positioning opening that closely receives the positioning projection.

Thereby, the positional precision can be positively ensured while the secondary member is allowed to accommodate the oscillation in the direction of the vibration welding.

The primary member may comprise a mounting feature for attaching another component to the base member. Thereby, the primary member which may be of a relatively small size may be used as a support bracket for a larger component part so that the positional accuracy of the large component can be achieved while improving the work efficiency of the welding process.

Typically, the primary member is provided with at least one opening through which a welding piece of the secondary member is welded to the base member so that the secondary member is enabled to evenly apply a force required to secure the primary member to the base member. For added integrity of the entire assembly, the secondary member may be additionally vibration welded to the primary member. The base member may comprise an automotive instrument panel among other possibilities.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
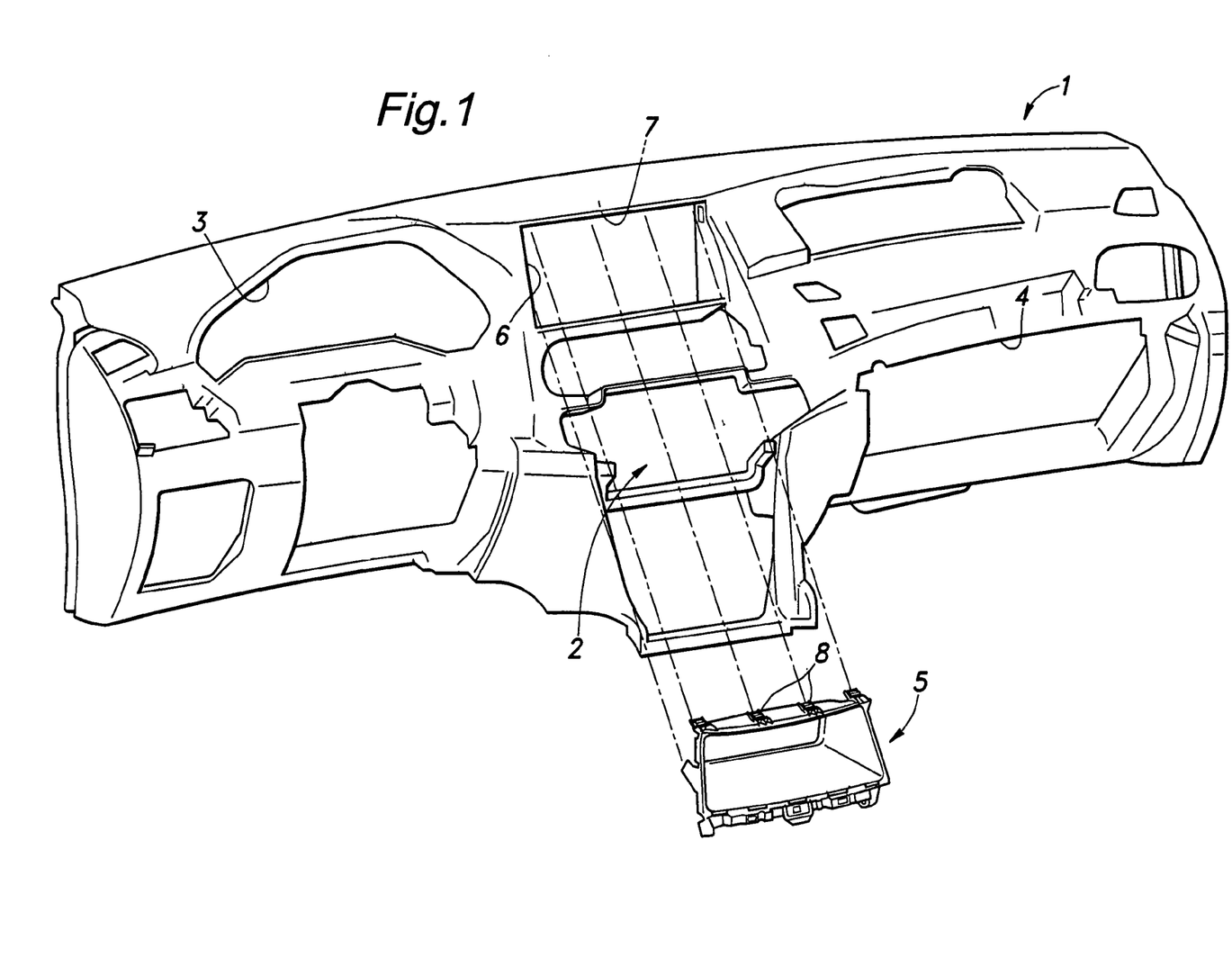
FIG. 1 is a perspective view of an automotive instrument panel embodying the present invention.

FIG. 1 is a perspective view of an automotive instrument panel embodying the present invention. In particular, the present invention is applied to a bracket for mounting a display visor that surrounds a display located in a central part of the instrument panel for displaying car navigation and other information.

The instrument panel 1 is provided with a plurality of openings 2 one above another in a central part thereof for receiving display and switch consoles for a car navigation system, an audio system and an air conditioning system, respectively. Other openings provided in the instrument panel 1 include an opening 3 on the left hand side thereof for such instruments as a speedometer, a fuel gage and a tachometer, and an opening 4 on the right hand side thereof for defining an access opening of a glove box. The instrument panel 1 is at least partly made of an integrally molded thermoplastic plastic member. In this case, the entire instrument panel 1 is made of an integrally molded thermoplastic plastic member.

The display visor 5 is a separate component that surrounds a display unit typically including an LCD panel not shown in the drawings. The display visor 5 is generally fitted into one of the central openings 6 of the instrument panel 1, and is secured in position by using a mounting arrangement that includes a mounting bracket 11 interposed between the upper edge of the opening 6 defining a mounting surface 7 and the opposing upper edge of the display visor 5 as shown in FIG. 1. Along the upper edge of the display visor 5 are provided a plurality of mounting claws 8 at a regular interval for engaging the mounting bracket 11.

Figure 2:
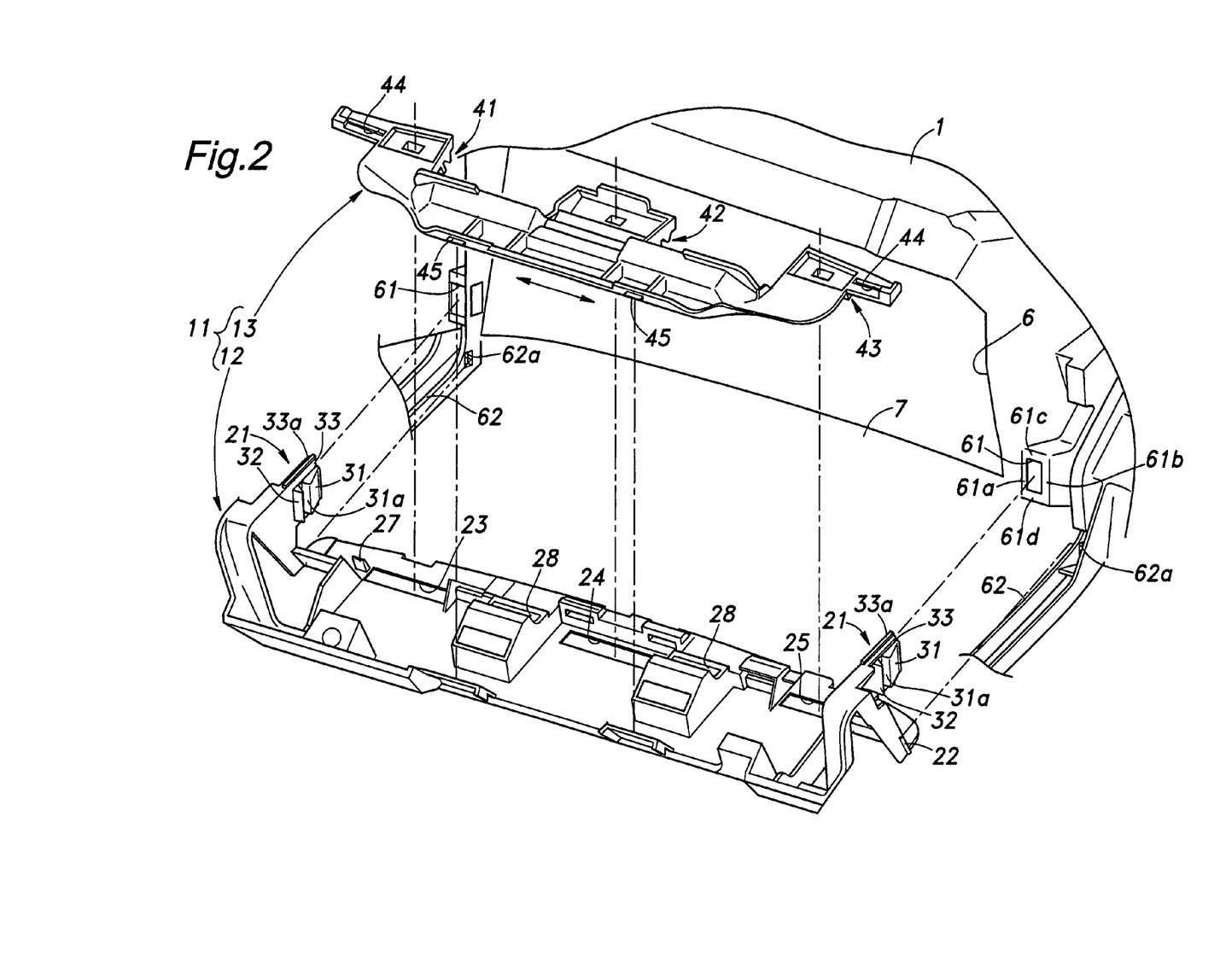
FIG. 2 is an exploded perspective view of the mounting bracket 1 as seen from the rear side (remote from the vehicle operator) of the instrument panel which is inverted from the normal orientation for the convenience of illustration.
Figure 3:
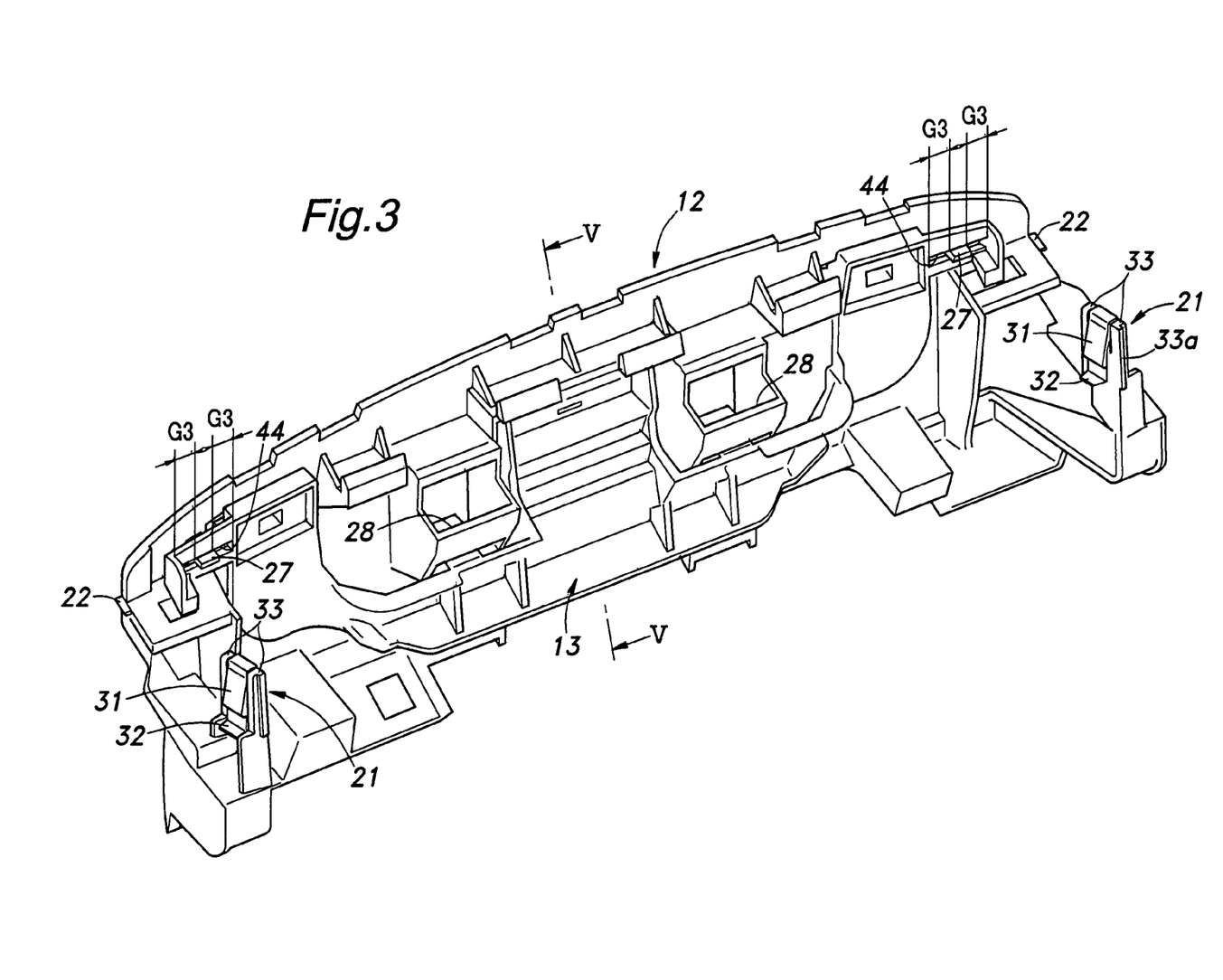
FIG. 3 is a perspective a view showing the mounting bracket 1 at an intermediate step of the assembling process of the mounting bracket 11 as seen from the front side (from under the instrument panel)
Figure 4:
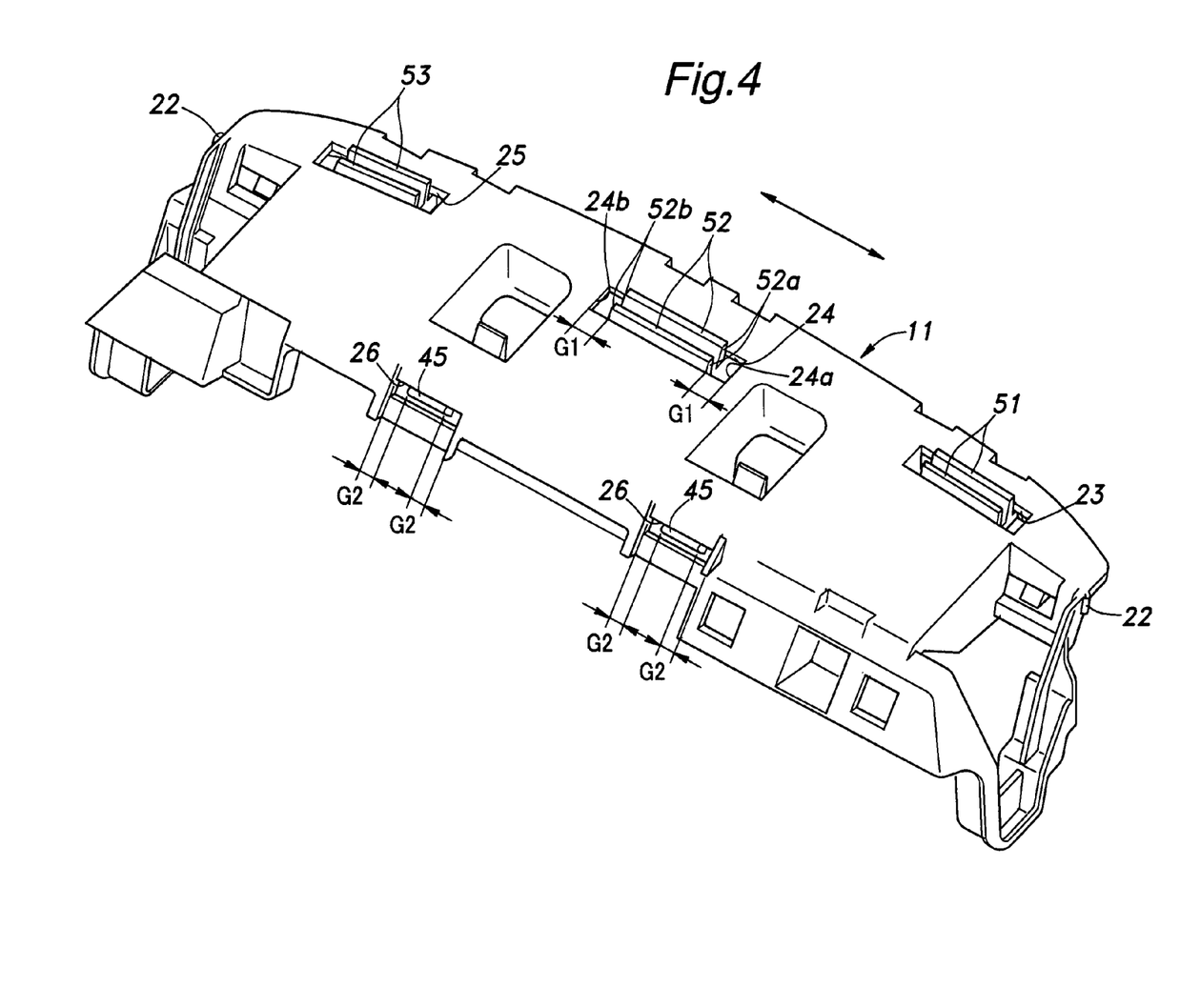
FIG. 4 is a perspective view showing the mounting bracket 11 at an intermediate step of the assembling process of the mounting bracket 11 as seen from the rear side (from above the instrument panel)

FIG. 2 is an exploded perspective view of the mounting bracket 11 as seen from the rear side (remote from the vehicle operator) of the instrument panel which is inverted from the normal orientation for the convenience of illustration. FIGS. 3 and 4 are perspective views showing the mounting bracket 11 at an intermediate step of the assembling process of the mounting bracket 11 as seen from the front side (from under the instrument panel) and from the rear side (from above the instrument panel), respectively.

The mounting bracket 11 consists of two parts, a primary bracket part 12 defining a mounting surface configured have the display visor 5 attached thereto, and a secondary bracket part 13 configured to be vibration welded to the instrument panel 1 with the primary bracket part 12 interposed between the instrument panel 1 and secondary bracket part 13. The primary and secondary bracket parts 12 and 13 are each integrally molded with thermoplastic plastic material in the illustrated embodiment, but are only required to be at least partly made of material suitable for vibration welding.

Prior to vibration welding the secondary bracket part 13 to the instrument panel 1 as will be described hereinafter, as shown in FIGS. 3 and 4, the primary and secondary bracket parts 12 and 13 are temporarily joined to each other (in a laterally moveable manner relative to each other), and the primary bracket part 12 is properly positioned relative to the instrument panel 1.

For the purpose of positioning the primary bracket part 12 with respect to the instrument panel 1, the primary bracket part 12 is provided with a pair of engagement portions 21 and a pair of projections 22. The primary bracket part 12 is additionally provided with openings 23 to 25 for exposing the welding portions of the mounting surface 7 of the instrument panel 1 with respect to the corresponding welding portions 51 to 53 of the secondary bracket part 13, a pair of openings 26 (FIG. 4) and a pair of engagement pieces 27 (FIG. 3) for temporarily joining the primary bracket part 12 and secondary bracket part 13 to each other and a pair of mounting holes 28 for mounting the display visor 5 to the instrument panel 1.

Referring to FIG. 2, the engagement portions 21 extend forward (toward the vehicle operator) from lower parts of the primary bracket part 12 on either lateral end thereof, and each comprise a resiliently deformable engagement claw 31 projecting laterally in both directions, an abutting projection 32 projecting laterally in both directions at a small distance from the rear end 31a of the engagement claw 31 and a pair of rigid wall sections 33 extending along upper and lower sides of the engagement portion 21. Each rigid wall section 33 is provided with a rib 33a extending along the length of the engagement portion 21. The projections 22 project laterally outwardly from upper parts of the lateral sides of the primary bracket part 12.

The secondary bracket part 13 is provided with welding portions 41 to 43, which are to be welded to the instrument panel 1, and openings 44 (FIG. 3) for receiving the corresponding engagement pieces 27 of the primary bracket part 12. The secondary bracket part 13 also includes a plurality of engagement pieces 45 (FIGS. 2, 4) which are configured to be fitted into corresponding openings 26 of the primary bracket part 12 for temporary attachment of the primary and secondary bracket parts 12, 13 together prior to welding of the secondary bracket part 13 to the instrument panel 1. The engagement pieces 45 and/or engagement pieces 27 may consist of simple tabs or may be at least partly provided with barbs so that a snap fit engagement may be achieved. Any other known arrangements can be used for temporarily retaining the two bracket parts 12 and 13 together, as long as the two parts can be joined or retained until the welding is completed. It is desirable that the arrangement for retaining the two bracket parts 12 and 13 does not involve friction or any other mutual constraint that interferes with the vibration welding of the secondary bracket part 13 to the instrument panel. The secondary bracket part 13 is oscillated in the lateral direction, as indicated by arrows in FIG. 2, at the time of the vibration welding. The secondary bracket part 13 has the function to attach the primary bracket part 12 to the instrument panel 1, but may be provided with a feature such as an opening for mounting an additional component part that does not require a high positional precision.

The welding portions 41 to 43 are provided on the side of the secondary bracket part 13 facing the primary bracket part 12, at positions corresponding to the openings 23 to 25 of the primary bracket part 12. Each welding portion 41, 42, 43 is respectively provided with a pair of first welding pieces 51, 52, 53 extending substantially perpendicularly to a major plane of the secondary bracket part 13, and a pair of second welding pieces 54, 55, 56 (FIGS. 5a to 5c) extending in parallel with the corresponding first welding pieces by a significantly smaller distance and flanking the corresponding first welding pieces. The openings 44 and engagement pieces 45 of the secondary bracket part 13 are located so as to correspond to the corresponding engagement pieces 27 and openings 26 of the primary bracket part 12, respectively. However, it suffices if the welding portions 41 to 43 are configured to be welded to the instrument panel 1 via the first welding pieces 51 to 53, but they may also be additionally configured to be welded to the primary bracket part 12 as well, via the second welding pieces 54 to 56, so that the primary bracket part 12 may be more firmly attached to the instrument panel 1.

The openings 23 to 25 of the primary bracket part 12 are provided for the purpose of exposing the instrument panel 1 to the corresponding welding portions 41 to 43 of the secondary bracket part 13, and may be formed in various different manners. For instance, the number of the openings, and the shape and size of each opening may be changed as desired as long as they correspond to the corresponding welding portion of the primary bracket part 12. At least one of the openings may consist of a notch formed along a peripheral part of the secondary bracket part 13. It is also possible that at least one of the welding portions is welded to the instrument panel 1 at a part outwardly adjacent to a peripheral part of the secondary bracket part 13.

When temporarily joining the primary bracket part 12 and secondary bracket part 13 to each other, first of all, the engagement pieces 27 of the primary bracket part 12 are fitted into the corresponding openings 44 of the secondary bracket part 13 as shown in FIG. 3. This causes the first welding pieces 51 to 53 of the secondary bracket part 13 to be passed into the openings 23 to 25 of the primary bracket part 12, and the engagement pieces 45 of the secondary bracket part 13 to be passed into the openings 26 of the primary bracket part 12 as shown in FIG. 4.

As shown in FIG. 4, the lateral width of each opening 23, 24, 25 of the primary bracket part 12 (along the direction indicated by arrows which correspond to the direction of the oscillation at the time of the welding) is somewhat greater than the width of the corresponding first welding piece 51, 52, 53. In other words, a gap G1 is defined between each side edge 52a, 52b of the first welding piece 52 and the opposing edge 24a, 24b of the corresponding opening 24. The same is true with the remaining first welding pieces 51 and 53. Similarly, a gap G2 is defined between each side edge of each engagement piece 45 and the opposing edge of the corresponding opening 26 of the secondary bracket part 13. Further, a gap G3 is defined between each side edge of each engagement piece 27 of the primary bracket part 12 and the opposing edge of the corresponding opening 44 of the secondary bracket part 13. The size of each of these gaps G1 to G3 may be suitably selected by taking into account the amplitude of the oscillations caused during the vibration welding process.

Owing to the presence of these gaps G1 to G3, the necessary relative movement in the direction of the oscillation between the primary bracket part 12 and secondary bracket part 13 is accommodated so that the vibration welding process can be performed in a favorable manner. Also, because the primary bracket part 12 and secondary bracket part 13 are joined to each other prior to the vibration welding process, the work efficiency at the time of attaching the mounting bracket 11 to the instrument panel 1 can be improved.

When positioning the primary bracket part 12 with respect to the instrument panel 1, the engagement portions 21 of the primary bracket part 12 are inserted in openings 61 formed in the instrument panel 1 on either lateral side of the mounting opening 6 of the instrument panel 1. At the same time, the projections 22 projecting laterally from either side edge of the primary bracket part 12 are fitted into openings 62a formed in a wall 62 of the mounting surface 7 of the instrument panel 1.

At this time, the rear end 31a of each engagement claw 31 is engaged by the side edges 61a and 61b of the corresponding opening 61 while the corresponding abutting projection 32 is engaged by the side edges 61a and 61b of the corresponding opening 61 from the opposite side of the wall of the instrument panel 1. Thereby, each side edge 61a, 61b of each opening 15 is interposed between the corresponding engagement claw 31 and abutting projection 32 for secure attachment, and this also ensures an accurate positioning of the primary bracket part 12 with respect to the instrument panel 1 in the direction perpendicular to a plane defined by the opening 6. The rib 33a on each rigid wall section 33 closely contacts the corresponding upper or lower edge 61c, 61d of the corresponding opening 61. Thereby, the primary bracket part 12 is accurately positioned with respect to the instrument panel 1 in a direction perpendicular to a major plane of the mounting surface 7 by being thus prevented from moving in this direction relative to the instrument panel 1. At this time, each projection 22 is fitted into the corresponding opening 62a formed in the wall 62, the movement of the primary bracket part 12 with respect to the instrument panel 12 (in the direction of the oscillation) is prevented, and this also contributes to an accurate positioning of the primary bracket part 12 with respect to the instrument panel 1.

Figure 5A:
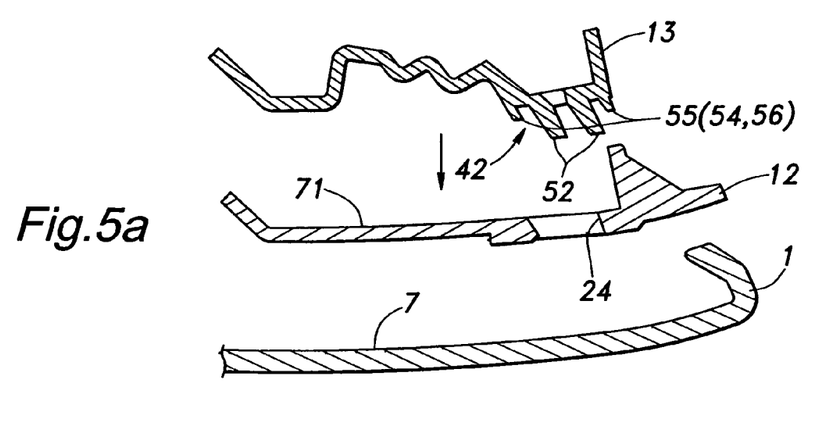
FIGS. 5a, 5b and 5c are sectional views taken along line V-V of FIG. 3 illustrating different stages of the process of mounting the mounting bracket of the first embodiment to the instrument panel 1.
Figure 5B:
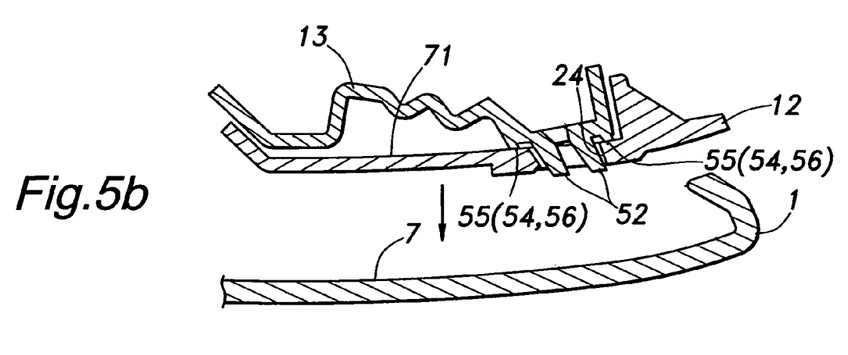
Figure 5C:
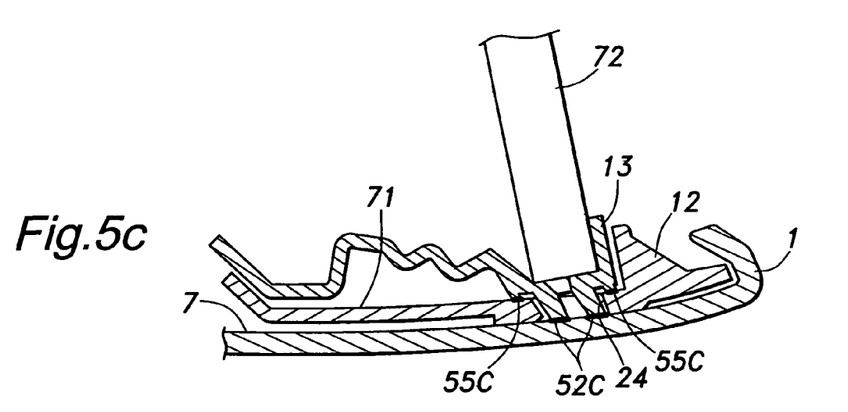

FIGS. 5a, 5b and 5c are sectional views illustrating the process of mounting the mounting bracket of the first embodiment to the instrument panel 1. The plane of the section of each of these sectional views including the section of the instrument panel 1 corresponds to line V-V in FIG. 3.

First of all, referring to FIG. 5a, the secondary bracket part 13 is moved toward the primary bracket part 12 as indicated by the arrow.

The secondary bracket part 13 is then pushed against the primary bracket part 12 until the secondary bracket part 13 rests upon an opposing surface 71 of a selected area of the primary bracket part 12. As a result, the engagement pieces 27 and 45 become engaged to the corresponding openings 44 and 26. At this time, the first welding pieces 52 of the secondary bracket part 13 are received in the corresponding opening 24 of the primary bracket part 12, and the free end of each first welding piece 52 slightly projects from the surface of the surrounding part of the primary bracket part 12 facing away from the secondary bracket part 13 while the second welding pieces 55 abut the surface of the surrounding part of the primary bracket part 12 facing the secondary bracket part 13 as shown in FIG. 5b. The same is true with the remaining first welding pieces 51 and 53 and second welding pieces 54 and 56.

Once the primary bracket part 12 is properly positioned with respect to the instrument panel 1, a welding tip 72 of a vibration welding device is applied to each welding portion from a side facing away from the instrument panel 1 as shown in FIG. 5c, and the secondary bracket part 13 is then oscillated in the direction perpendicular to the plane of the drawing, while the secondary bracket part 13 is pushed onto the instrument panel 1. The vibration welding device may consist of a known vibration welding device which uses the frictional heat generated by oscillating the object to be welded. The frequency of this oscillating movement may be selected freely, depending on the property of the object to be welded.

The frictional heat generated between each first welding piece 52 of the secondary bracket part 13 and the opposing surface 7 of the instrument panel 1 melts the surrounding part, and this causes the tip 52c of the first welding piece 52 to be welded to the opposing surface 7 of the instrument panel 1. Likewise, the frictional heat generated between each second welding piece 55 of the secondary bracket part 13 and the opposing surface 71 of the primary bracket part 12 melts the surrounding part, and this causes the tip 55c of the second welding piece 53 to be welded to the opposing surface 71 of the primary bracket part 12.

When mounting the display visor 5 to the mounting bracket 11, the mounting claws 8 of the display visor 5 are fitted into the corresponding mounting holes 28 of the primary bracket part 12 which is fixedly attached to the instrument panel 1. Thus, the display visor 5 can be mounted to the instrument panel 1 accurately, firmly and easily.

Figure 6:
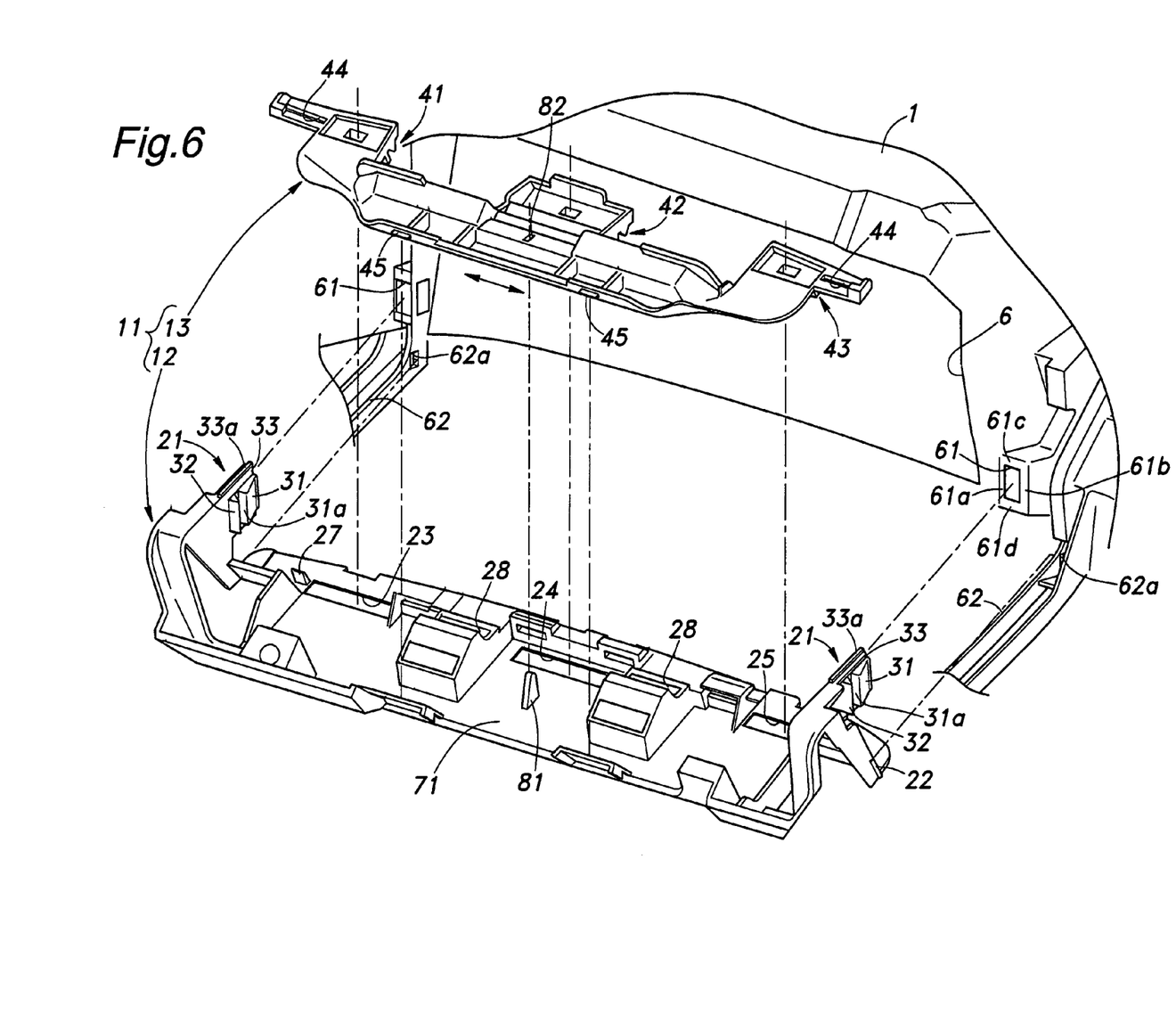
FIG. 6 is a view similar to FIG. 2 showing a second embodiment of the present invention.
Figure 7:
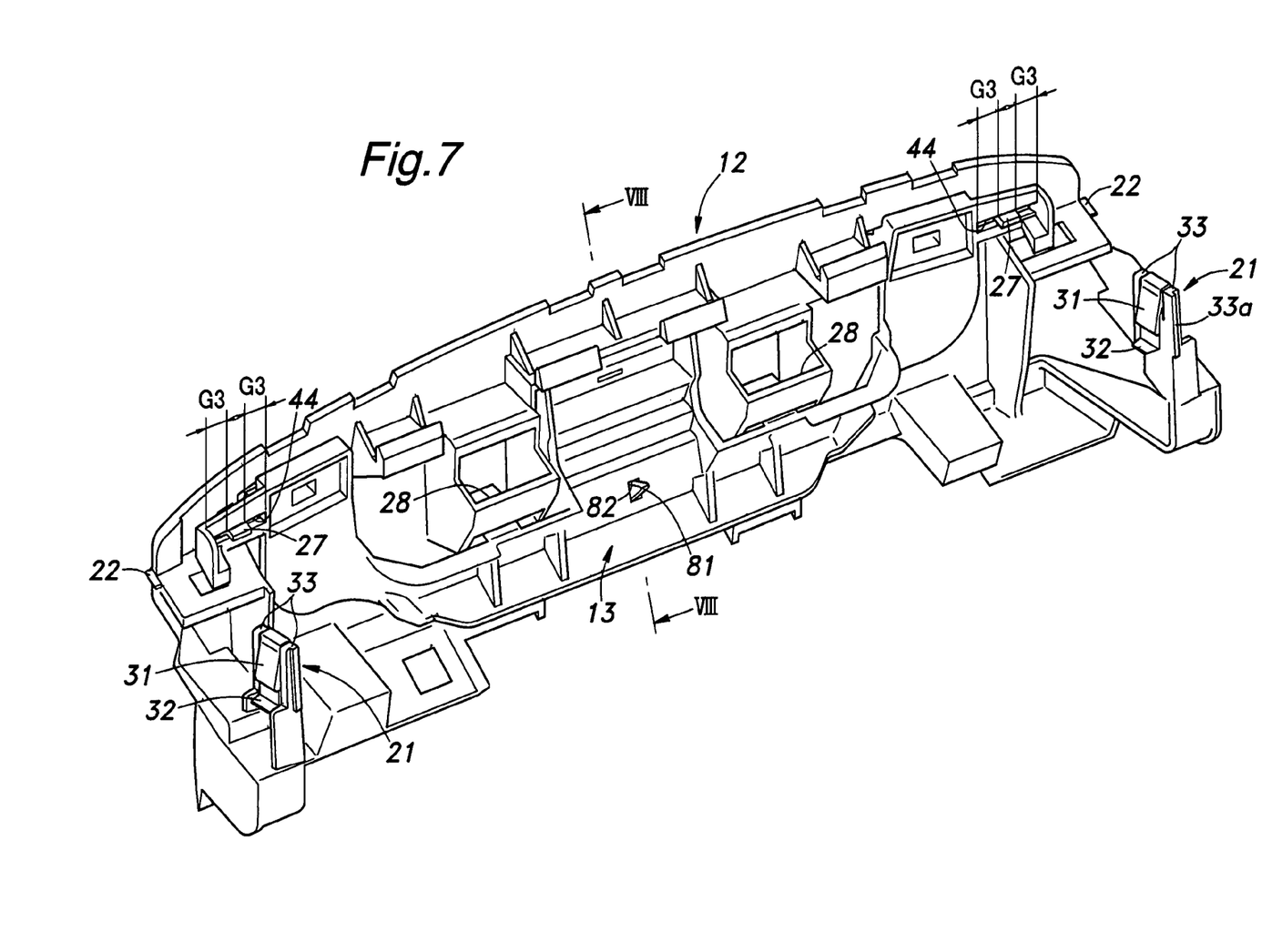
FIG. 7 is a view similar to FIG. 3 showing the second embodiment of the present invention.

FIG. 6 is an exploded perspective view of a second embodiment of the mounting bracket according to the present invention, again shown in an inverted orientation, and FIG. 7 is a perspective view of the mounting bracket as see from below. In the description of the second embodiment, the parts corresponding to those of the previous embodiment are denoted with like numerals without repeating the description of such parts.

In this embodiment, the surface of the primary bracket part 12 opposing the secondary bracket part 13 is provided with a positioning projection 81, and the secondary bracket part 13 is provided with a corresponding opening 82 that receives the positioning projection 81 when temporarily joining the two bracket parts 12 and 13 for positioning them to each other.

The positioning projection 81 consists of a triangular, relatively thin plate member having a base thereof connected to the opposing surface 71 and the apex opposing this base projecting upward. The major surface of the positioning projection 81 is substantially perpendicular to the lateral direction of the mounting bracket 11 which coincides with the direction of the oscillation of the vibration welding. Owing to the small thickness of the positioning projection 81, the positioning projection 81 is allowed to elastically deform in the direction of the oscillation of the vibration welding or the lateral direction so that the two bracket parts 12 and 13 can be accurately positioned to each other without obstructing the relative oscillation between them at the time of the vibration welding. The thickness of the positioning projection 81 may be selected so as not to obstruct the vibration welding process, and the opening 82 is required to receive at least a part of the positioning projection 81.

When temporarily joining the two bracket parts 12 and 13 to each other, the positioning projection 81 is fitted into the opening 82 as shown in FIG. 7. This positively positions the two bracket parts 12 and 13 in the lateral direction and maintains the gaps G1 to G3 mentioned in relation with FIG. 4 properly without fail so that the vibration welding can be performed without being interfered, and a favorable welding result can be ensured. The shapes and sizes of the positioning projection 81 and corresponding opening 82 can be selected at will. To take advantage of the resiliency of the positioning projection 81, it may be arranged such that only a free end of the positioning projection 81 is received by the opening 82.

Figure 8A:
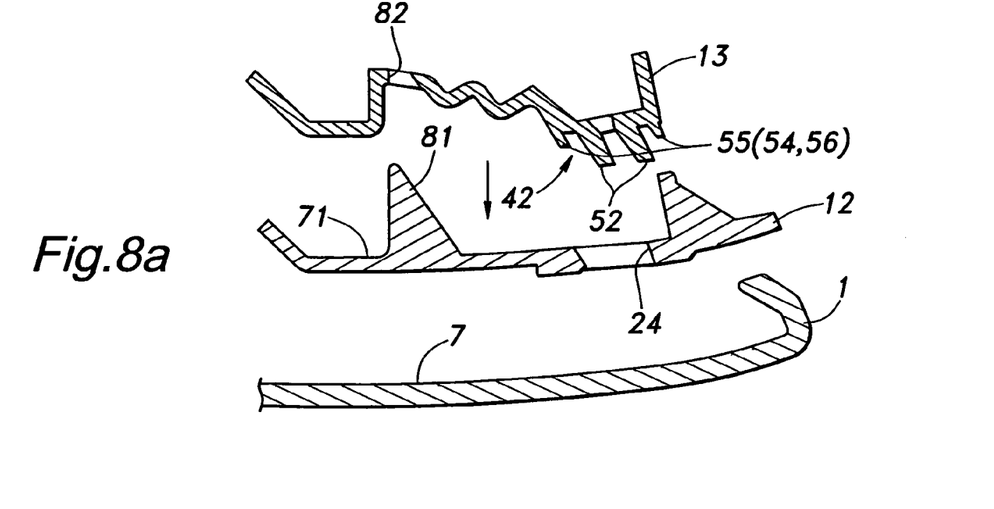
FIGS. 8a, 8b and 8c are sectional views taken along line VIII-VIII of FIG. 7 illustrating different stages of the process of mounting the mounting bracket of the second embodiment to the instrument panel 1.
Figure 8B:
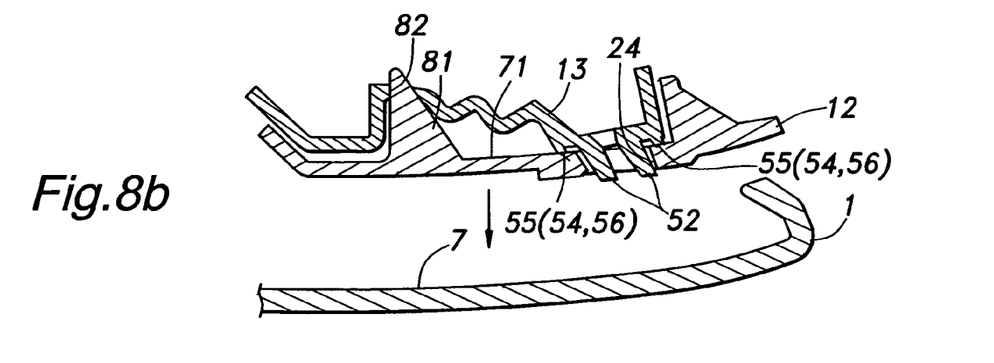
Figure 8C:
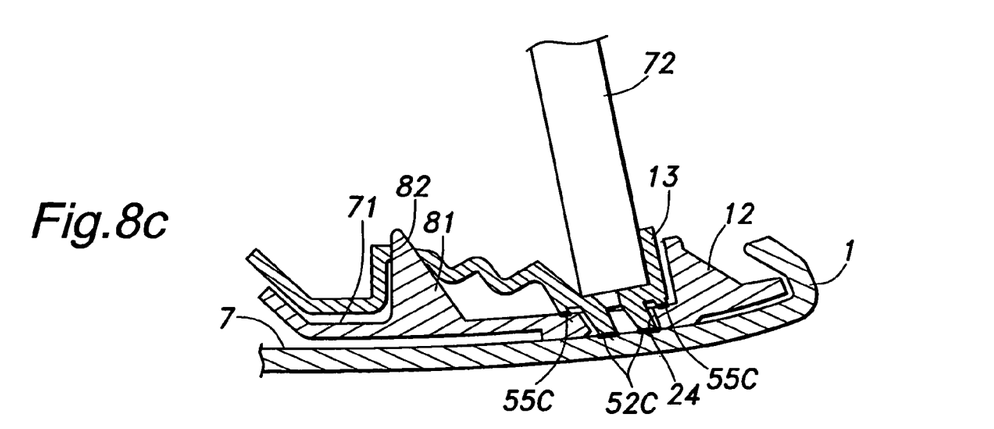

FIG. 8 is a simplified sectional view, including the section of the instrument panel, taken along line VIII-VIII of FIG. 7 showing the mode of joining the mounting bracket of the second embodiment to the instrument panel.

First of all, the secondary bracket part 13 is moved toward the primary bracket part 12 causing the positioning projection 81 to be received in the corresponding opening 82 as indicated by the arrow in FIG. 8a, and is then pushed against the primary bracket part 12 until the secondary bracket 12 rests upon an opposing surface 71 of a selected area of the primary bracket part 12 as shown in FIG. 8b. Thereby, the two bracket parts 12 and 13 are temporarily joined to each other in a similar manner as in the previous embodiment.

Once the primary bracket part 12 is positioned with respect to the instrument panel 1, the vibration welding may be started. Because the positioning projection 81 can be readily deformed in an elastic manner in the direction of the welding oscillation (perpendicular to the plane of the drawing) as shown in FIG. 8c, the vibration welding may be performed in a favorable manner while effectively preventing a positional error between the two bracket parts 12 and 13.

Although the present invention has been described in terms of preferred embodiments thereof, it is obvious to a person skilled in the art that various alterations and modifications are possible without departing from the scope of the present invention which is set forth in the appended claims.

The contents of the original Japanese patent applications on which the Paris Convention priority claim is made for the present application are incorporated in this application by reference.

The invention claimed is:

1. A welding arrangement for plastic components, comprising:
   a base member at least partly made of thermoplastic material;
   a primary attachment member abutting onto the base member, the primary attachment member being provided with a first positioning feature that engages a corresponding first positioning feature provided on the base member in response to movement of said primary attachment member towards said base member in a first direction; and
   a secondary attachment member at least partly made of thermoplastic material and vibration welded to the base member so as to at least partly interpose the primary attachment member between the secondary attachment member and the base member, and so as to couple the primary attachment member, via being attached to the secondary attachment member, to the base member;
   wherein the primary attachment member is provided with a second positioning feature comprising a tab or slot that engages a corresponding second positioning feature comprising a slot or tab provided on the secondary attachment member, wherein said second positioning features are configured and arranged so as to permit sliding positional adjustment therebetween in a prescribed direction corresponding to a direction of movement of the vibration welding.

2. The welding arrangement for plastic components according to claim 1, wherein the second positioning feature of the primary attachment member comprises a positioning projection configured to be resiliently readily deformable in the prescribed direction, and the corresponding second positioning feature of the secondary attachment member comprises a positioning opening that closely receives the positioning projection.

3. The welding arrangement for plastic components according to claim 1, wherein the secondary attachment member is provided with a retaining feature that engages with a corresponding retaining feature provided on the primary attachment member for retaining the primary attachment member to the secondary attachment member while permitting relative movement between them in a prescribed direction corresponding to the direction of movement of the vibration welding.

4. The welding arrangement for plastic components according to claim 1, wherein the primary attachment member comprises a mounting feature for attaching another component to the base member.

5. The welding arrangement for plastic components according to claim 1, wherein the primary attachment member is provided with at least one opening through which a welding piece of the secondary attachment member is welded to the base member.

6. The welding arrangement for plastic components according to claim 1, wherein the secondary attachment member is attached to the primary attachment member by vibration welding.

7. The welding arrangement for plastic components according to claim 1, wherein the base member comprises a component of an automotive instrument panel.

8. The welding arrangement for plastic components according to claim 1, wherein the first positioning feature of said primary attachment member comprises a pair of spaced-apart engagement portions extending outwardly proximate respective lateral end portions of the primary attachment member, each of said engagement portions comprising a resiliently deformable engagement claw projecting laterally in opposite directions, and a pair of spaced-apart abutting projections integrally formed with, and projecting laterally in opposite directions and separated by a small distance from said engagement claw;

and wherein the first positioning feature of said base member further comprises a pair of spaced-apart openings configured to respectively receive said engagement portions therein.

9. The welding arrangement for plastic components according to claim 8, wherein the first positioning feature of said primary attachment member further comprises a lateral projection extending laterally outwardly on each of said respective lateral end portions of the primary attachment member, and wherein the first positioning feature of said base member further comprises a pair of spaced-apart openings facing toward one another and configured to respectively receive said lateral projections therein.

10. A welding arrangement for plastic components, comprising:

a base member comprising a base body at least partly made of thermoplastic material;

a primary attachment member abutting onto the base member, the primary attachment member being provided with a first positioning feature that engages a corresponding first positioning feature provided on the base member, and a secondary attachment member at least partly made of thermoplastic material and vibration welded to the base member so as to at least partly interpose the primary attachment member between the secondary attachment member and base member, and so as to couple the primary attachment member, via being attached to the secondary attachment member, to the base member;

wherein the first positioning feature of said primary attachment member comprises:

a pair of spaced-apart engagement portions extending outwardly proximate respective lateral end portions of the primary attachment member, said engagement portions being substantially parallel to one another; and a lateral projection extending laterally outwardly on each of said respective lateral end portions of the primary attachment member, said lateral projections being substantially opposed to one another;

wherein the first positioning feature of said base member comprises a pair of spaced-apart openings formed in the base body and configured to respectively receive said engagement portions therein; and a pair of spaced-apart openings formed in the base body facing toward one another, and configured to respectively receive said lateral projections therein; and wherein the primary attachment member engages the secondary attachment member so as to permit sliding positional adjustment therebetween in a prescribed direction corresponding to a direction of movement of the vibration welding.

11. The welding arrangement for plastic components according to claim 10, wherein the primary attachment member is provided with a second positioning feature that engages a corresponding second positioning feature provided on the secondary attachment member so as to permit positional adjustment between them in a prescribed direction corresponding to a direction of movement of the vibration welding.

12. The welding arrangement for plastic components according to claim 11, wherein the second positioning feature of the primary attachment member comprises a positioning projection configured to be resiliently readily deformable in the prescribed direction, and the corresponding second positioning feature of the secondary attachment member comprises a positioning opening that closely receives the positioning projection.

13. The welding arrangement for plastic components according to claim 10, wherein the secondary attachment member is provided with a retaining feature that engages with a corresponding retaining feature provided on the primary attachment member for retaining the primary attachment member to the secondary attachment member while permitting relative movement between them in a prescribed direction corresponding to a direction of movement of the vibration welding.

14. The welding arrangement for plastic components according to claim 10, wherein the primary attachment member comprises a mounting feature for attaching another component to the base member.

15. The welding arrangement for plastic components according to claim 10, wherein the primary attachment member is provided with at least one opening through which a welding piece of the secondary attachment member is welded to the base member.

16. The welding arrangement for plastic components according to claim 10, wherein the secondary attachment member is attached to the primary attachment member by vibration welding.

17. The welding arrangement for plastic components according to claim 10, wherein the base member comprises a component of an automotive instrument panel.

18. The welding arrangement for plastic components according to claim 10, wherein each of said engagement portions comprises a resiliently deformable engagement claw projecting laterally in opposite directions, and a pair of spaced-apart abutting projections integrally formed with, and projecting laterally in opposite directions and separated by a small distance from said engagement claw.

* * * * *